United States Patent
Alston, Jr.

(10) Patent No.: US 11,522,435 B1
(45) Date of Patent: Dec. 6, 2022

(54) ELECTROMAGNETIC PAYLOAD ORIENTATION CONTROL

(71) Applicant: Rodney K. Alston, Jr., Austin, TX (US)

(72) Inventor: Rodney K. Alston, Jr., Austin, TX (US)

( * ) Notice: Subject to any disclaimer, the term of this patent is extended or adjusted under 35 U.S.C. 154(b) by 0 days.

(21) Appl. No.: 17/806,455

(22) Filed: Jun. 10, 2022

Related U.S. Application Data

(60) Provisional application No. 63/202,459, filed on Jun. 11, 2021.

(51) Int. Cl.
*H02K 41/06* (2006.01)
*H04N 5/232* (2006.01)

(52) U.S. Cl.
CPC ....... *H02K 41/065* (2013.01); *H04N 5/23299* (2018.08)

(58) Field of Classification Search
CPC .................................................... H02K 41/065
See application file for complete search history.

(56) References Cited

U.S. PATENT DOCUMENTS

| | | | |
|---|---|---|---|
| 5,788,394 A | 8/1998 | Hess et al. | |
| 6,127,762 A * | 10/2000 | Pedlar | G01C 19/06 446/256 |
| 6,326,714 B1 * | 12/2001 | Bandera | H02K 26/00 310/152 |
| 7,570,880 B2 | 8/2009 | Yoon et al. | |

(Continued)

FOREIGN PATENT DOCUMENTS

| | | |
|---|---|---|
| EP | 3423874 A2 | 1/2019 |
| JP | 5488131 B2 | 5/2014 |
| JP | 5518863 B2 | 6/2014 |

OTHER PUBLICATIONS

Kim, et al, Development of a Spherical Reaction Wheel Actuator Using Electromagnetic Induction. Aerospace Science and Technology 2014, 39, 86-94, retrieved from the internet Apr. 12, 2021, <https://www.sciencedirect.com/science/article/pii/S1270963814001758>.

(Continued)

*Primary Examiner* — Dang D Le
(74) *Attorney, Agent, or Firm* — Craige Thompson; Thompson Patent Law; Timothy D. Snowden

(57) ABSTRACT

Apparatus and associated methods relate to an electromagnetic steered orientation device. In an illustrative example, an exemplary electromagnetic payload orientation device (EPOD) includes a rotor, a stator, and a payload mounted on the rotor. The rotor, for example, may be coupled to a magnetic source. For example, the stator may include electromagnetic coils operable by a controller circuit to induce relative rotation between the rotor and the stator. In some examples, the rotor is a sphere provided with one or more guide tracks on an outer surface, and the stator is a concentric shell surrounding the sphere provided with at least one follower corresponding to the guide tracks such that a relative rotation between the rotor and stator is constrained by the guide track to follow a predetermined motion profile. Various embodiments may advantageously provide a substantially smooth and low voltage mechanism to orient the payload.

20 Claims, 10 Drawing Sheets

(56) References Cited

U.S. PATENT DOCUMENTS

| | | | |
|---|---|---|---|
| 7,675,208 B2* | 3/2010 | Bandera | H02K 16/00 |
| | | | 310/80 |
| 10,276,289 B1 | 4/2019 | Kirby et al. | |
| 10,606,066 B2* | 3/2020 | Peyman | G02B 7/28 |
| 11,411,485 B2* | 8/2022 | P.V | H02K 41/065 |
| 2016/0278841 A1 | 9/2016 | Panescu et al. | |
| 2021/0041705 A1 | 2/2021 | Pedder et al. | |
| 2021/0092293 A1 | 3/2021 | Artonne | |
| 2022/0014085 A1* | 1/2022 | Mahajan | B64D 27/24 |

OTHER PUBLICATIONS

Liu, et al, Design and Analysis of a Magnetic Actuated Capsule Camera Robot for Single Incision Laparoscopic Surgery; Hamburg Germany, 2015; p. 7, retrieved from the internet Apr. 14, 2021, <https://ieeexplore.ieee.org/abstract/document/7353379/>.

Maeda, et al, Characteristics Verification of an Independently Controllable Electromagnetic Spherical Motor. Sensors 2014, 14 (6), 10072-10080, retrieved from the internet Apr. 14, 2021, <https://www.mdpi.com/1424-8220/14/6/10072>.

Mustafa Electrical, Electromagnetic spherical Actuator, 2019, retrieved from the internet Apr. 12, 2021, https://<www.bing.com/images/search?view=detailV2&ccid=MMqVuZoU&id=27966CE6BBFE361DEC97448378BC2E87E462D081&thid=OIP.MMqVuZoUaXM8JDp1ySlrbwHaFj&mediaurl=https://i.ytimg.com/vi/GIhRBdnXqBM/hqdefault.ipg&exph=360&expw=480&q=spherical+electromagnetic.

Owl Labs, Meeting Owl Pro, retrieved from the internet Apr. 14, 2021, <https://owllabs.com/products/meeting-owl-pro>.

Science Direct, Magnetic Tracker—an overview, retrieved from the internet Apr. 15, 2021, <https://www.sciencedirect.com/topics/computer-science/magnetic-tracker>.

Vera, L., Examples of Tracking Systems: Which Is the Best Choice, retrieved from the internet Apr. 14, 2021, <https://3dcoil.grupopremo.com/blog/tracking-systems-virtual-reality-the-best-choice/>.

Yan, et al, Electromagnetic Modeling and Structure Optimization of a Spherical Force Sensing System. Sensors 2019, 19 (3), 552, retrieved from the internet Apr. 14, 2021, <https://www.mdpi.com/1424-8220/19/3/552>.

Yan, et al, Magnetic Field Analysis of Electromagnetic Spherical Actuators with Multiple Radial Poles, retrieved from the internet Apr. 14, 2021, <https://ieeexplore.ieee.org/abstract/document/7353379>.

\* cited by examiner

ELECTROMAGNETIC PAYLOAD ORIENTATION CONTROL

CROSS-REFERENCE TO RELATED APPLICATIONS

This application claims the benefit of U.S. Provisional Application Ser. No. 63/202,459, titled "ELECTROMAGNETIC PAYLOAD ORIENTATION CONTROL," filed by Rodney Alston, on Jun. 11, 2021.

This application incorporates the entire contents of the foregoing application(s) herein by reference.

TECHNICAL FIELD

Various embodiments relate generally to electromagnetic orientation of a payload.

BACKGROUND

Video conferencing is a type of virtual, online meeting where two or more people talk through a video and audio call in real-time. For example, a video conference can be a point to point video conference involving two participants in different locations. For example, a video conference can be a multi-point video conference where three or more people in at least two locations (e.g., a business meeting with some participants at the office and others remote, or a webinar where a person streams to viewers in several locations). To join a video conference, for example, participants typically may be required to have a web camera for video capturing, a microphone for voice capturing, a speaker or headphone for playing sound from the video conference, and a computing device connecting through the Internet to run a video conference software.

During the COVID-19 pandemic, for example, teaching webinars sometimes become a viable channel for teaching and instruction in a lock-down and/or for quarantined students. Although this new form of transferring knowledge may have advantages of, for example, being more inclusive, more affordable, less time-consuming, and/or more conveniently accessible, teaching webinars may also present new challenges to teachers and instructors.

SUMMARY

Apparatus and associated methods relate to an electromagnetic steered orientation device. In an illustrative example, an exemplary electromagnetic payload orientation device (EPOD) includes a rotor, a stator, and a payload mounted on the rotor. The rotor, for example, may be coupled to a magnetic source. For example, the stator may include electromagnetic coils operable by a controller circuit to induce relative rotation between the rotor and the stator. In some examples, the rotor is a sphere provided with one or more guide tracks on an outer surface, and the stator is a concentric shell surrounding the sphere provided with at least one follower corresponding to the guide tracks such that a relative rotation between the rotor and stator is constrained by the guide track to follow a predetermined motion profile. Various embodiments may advantageously provide a low voltage mechanism with smooth operation to orient the payload.

Various embodiments may achieve one or more advantages. For example, some embodiments may include an object tracking module to advantageously orient the payload automatically to a target. Some embodiments may, for example, include a thermal imaging array as the payload so that the EPOD may be configured to advantageously track a thermal target. Some embodiments may include an optical sensor as the payload to advantageously track an image object. For example, some embodiments may include the predetermine motion profile defined as a function of the at least one guide track such that an angle between the optical axis and the axis of rotation may advantageously less than 180 degrees.

For example, some embodiments may advantageously address a technological problem of engagements between students and teachers being impaired due to lack of visibility (e.g., of facial expression) due to technical difficulties (e.g., limitation in a size of viewing frame, movement of a student relative to the camera). Such embodiments may, for example, advantageously mechanically track a user using an EPOD equipped with a camera payload.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an electromagnetic payload orientation device (EPOD) is introduced with reference to FIGS. 1A-1C. Second, that introduction leads into a description with reference to FIGS. 2A-2B of some exemplary embodiments of EPOD. Third, with reference to FIGS. 3-5, alternative embodiments are described in application to the exemplary EPOD. Fourth, with reference to FIG. 6, the discussion turns to exemplary embodiments that illustrate an exemplary EPOD for controlling focus and/or aperture of an optical sensor. Fifth, and with reference to FIG. 7, this document describes exemplary apparatus and methods useful for electromagnetically orienting and steering using the EPOD. Finally, the document discusses further embodiments, exemplary applications and aspects relating to electromagnetic steered orientation devices.

Figure 1A:
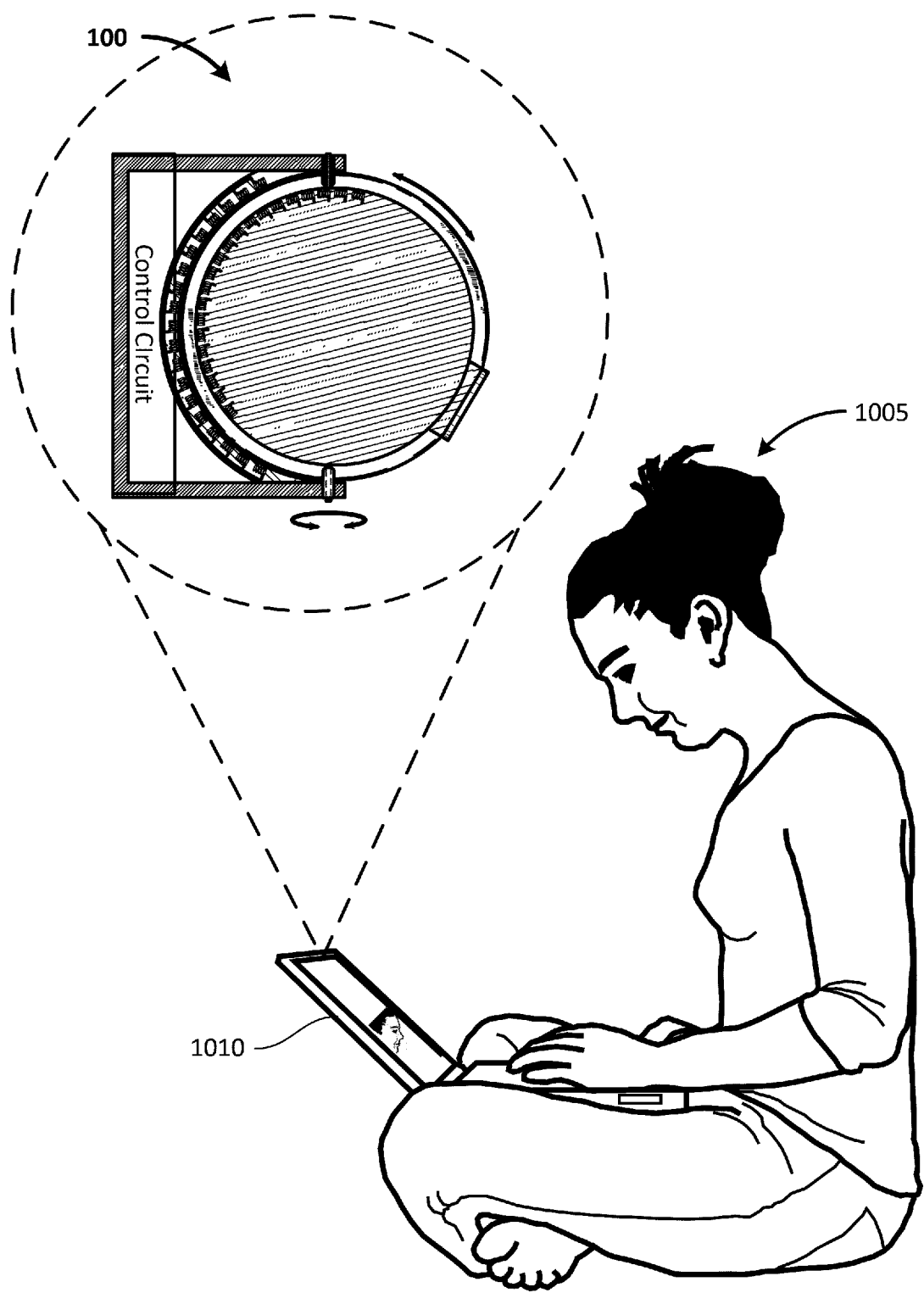
FIG. 1A, FIG. 1B, and FIG. 1C depict an exemplary electromagnetic payload orientation device (EPOD) employed in an illustrative use-case scenario, the EPOD having a spherical rotor coupled to an array of electromagnetic sources.
Figure 1B:
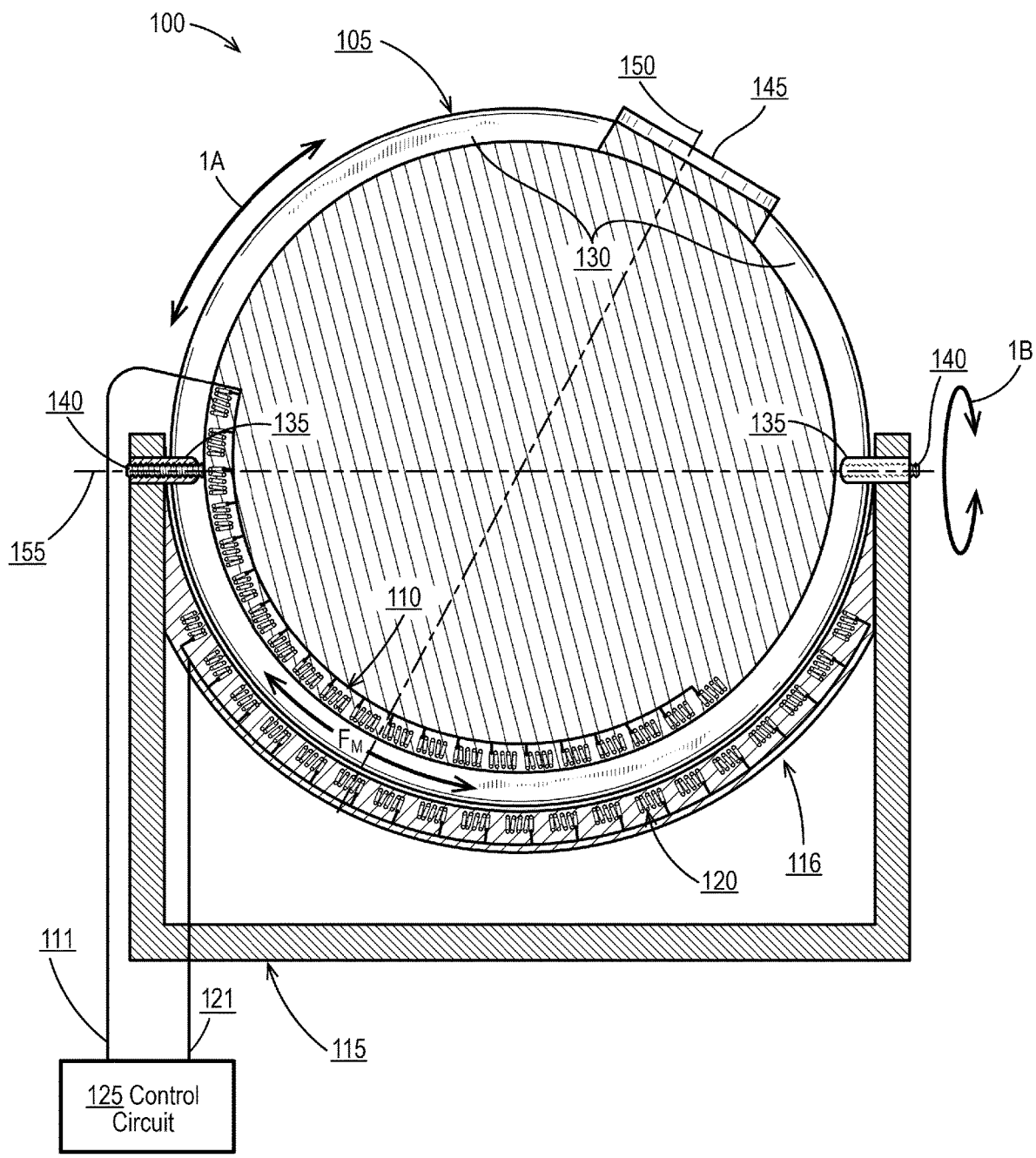
Figure 1C:
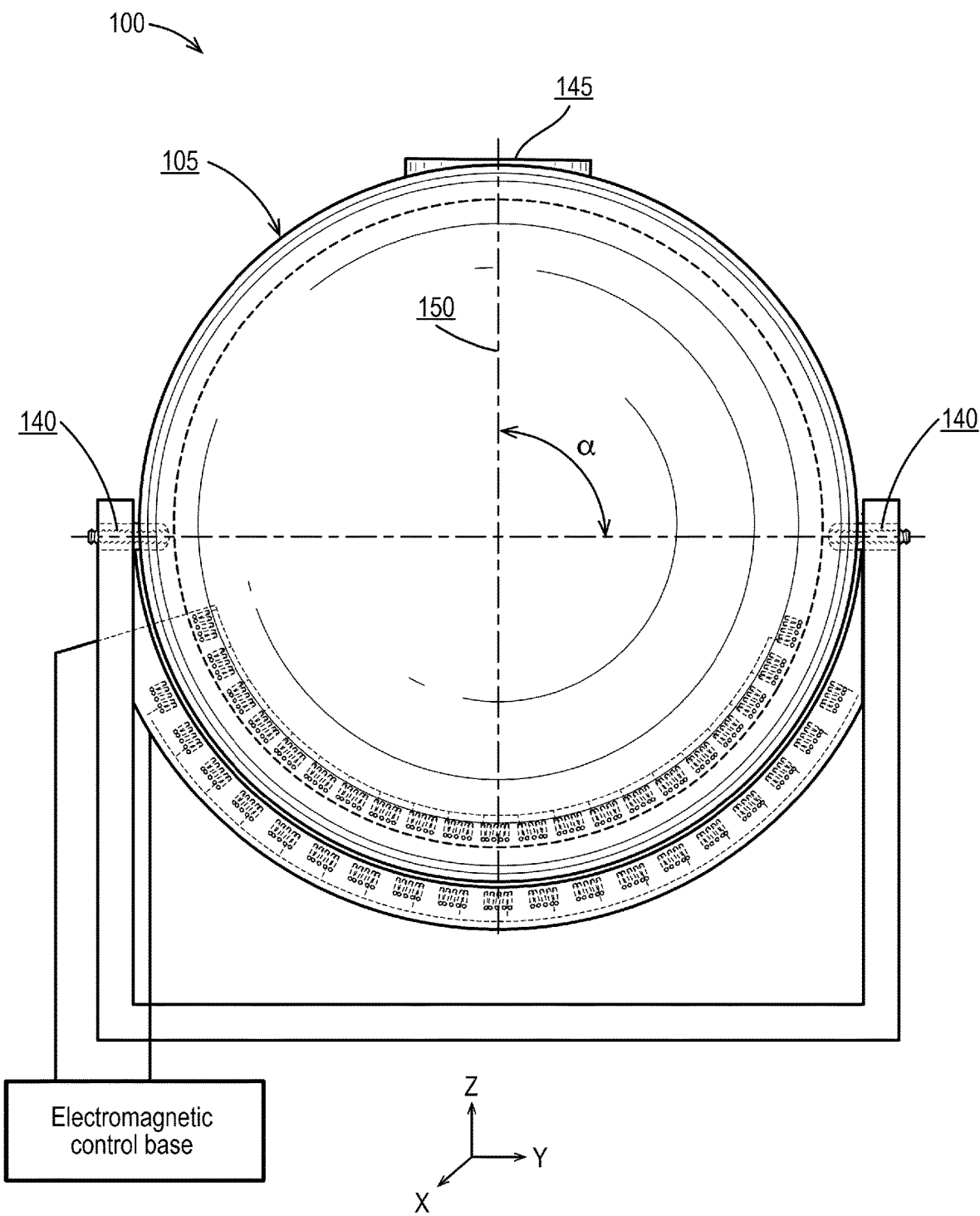

FIG. 1A, FIG. 1B, and FIG. 1C depict an exemplary electromagnetic payload orientation device (EPOD 100) employed in an illustrative use-case scenario. As shown in FIG. 1A, a user 1005 is using a laptop 1010 to, for example, online communicate with other users through a computer network (e.g., having an online conference, taking an online course, or otherwise meeting with other users via a wired or wireless network).

During an online communication, the laptop 1010 may, for example, continuously capture an image of the user 1005 using the EPOD 100. For example, the EPOD 100 may include an optical sensor (e.g., a camera) for capturing images. In some examples, the laptop may stream the captured images to the other users' device through the computer network during the online communication. In some implementations, when the user 1005 move during the online communication, the EPOD 100 may be configured to move in one or more predetermined tracks to advantageously keep a face of the user 1005 at a center of captured images.

In an illustrative close-up image shown in FIG. 1A, the EPOD 100 includes a rotor 105. The rotor, in this example, includes a magnetic source 110. A stator 115 includes multiple electromagnetic coils 120. For example, the electromagnetic coils 120 may be controlled by a control circuit 125. In some implementations, the control circuit 125 may operate the electromagnetic coils 120 to induce a magnetic force on the magnetic source 110 to impart relative rotation between the rotor 105 and the stator 115.

As shown, the rotor 105 includes two guide tracks 130 on an outer surface. The EPOD 100 includes two followers 135, in this example, each protruding radially inward to slidingly engage one of the corresponding guide tracks 130. For example, accordingly, the relative rotation between the rotor 105 and stator 115 may be constrained by the guide tracks 130 to follow a predetermined motion profile.

As shown in FIGS. 1B-1C, the EPOD 100 having a spherical rotor coupled to an array of electromagnetic sources. In the depicted embodiment an EPOD is provided with a rotor 105 having a magnetic source 110. As depicted, the magnetic source 110 includes an array of magnetic sources. The magnetic sources 110 may, by way of example and not limitation, be permanent magnets, electromagnetic coils, or some combination thereof. The electromagnetic sources may, by way of example and not limitation, include individual electromagnetic (EM) coils, miniaturized coils, coils on a printed circuit board (PCB) (e.g., flexible, rigid), or some combination thereof. In various embodiments the EM source may, for example, be multi-dimensional (e.g., multiple layers), disposed on a curved surface (e.g., as depicted), or some combination thereof. In the depicted example, the coils of the magnetic source 110 are electrically connected by at least one harness 111. In various embodiments, the harness 111 may be wired, individual wiring harnesses may be supplied to each coil and/or to groups of coils, the harness may be embedded (e.g., printed traces) in a circuit board and/or directly in the rotor 105, or some combination thereof.

The rotor 105 is disposed within a stator 115 (shown in cross-section). In the depicted example, the stator 115 is constructed as a shell configured to receive the rotor 105 in rotatable communication. The depicted stator 115 includes an outer (rectangular) housing (e.g., configured to be mounted to a desired object) and a semi-spherical inner shell 116. The inner shell 116 is provided with an array(s) of electromagnetic coils 120. As depicted, the electromagnetic coils 120 are embedded in the inner shell 116. The coil 120 are connected by a harness 121. In various embodiments the coils 120 may, by way of example and not limitation, be provided with individual harnesses, groups of coils may be provided with harnesses, harnesses may be embedded in a circuit board(s) and/or directly in the rotor 105, or some combination thereof.

The (electro)magnetic source 110 and the electromagnetic coils 120 are in electrical communication with at least one control circuit 125 via the harnesses 111 and 121, respectively. In various embodiments various coils may, for example, be provided with individual and/or shared control circuits. Control circuits may, for example, be embedded in the EPOD 100, be disposed adjacent to the EPOD 100, may be remotely connected (e.g., via wired and/or wireless connections), or some combination thereof. The control circuit(s) 125 may, by way of example and not limitation, provided power and/or control to the respective electromagnetic coils. For example, the control circuit(s) 125 may operate the source 110 and/or coils 120 to induce a gradated electromagnetic field (e.g., continuous gradient, stepped gradient). For example, the control circuit may energize the electromagnetic coils 120 with a relatively low voltage (e.g., 3-6V). Accordingly, a magnetic force (Fm) may be generated between the source 110 the coils 120.

The rotor 105 is provided with guide tracks 130. As depicted, the rotor 105 includes at least two guide tracks 130. In various embodiments, the guide tracks 130 may be (uniformly) distributed circumferentially about a z-axis 150. For example, two additional guide tracks 130 may be provided on the other side. In various embodiments, one or more pairs of guide tracks 130 may be provided. Each pair may, for example, be disposed along a single line extending across the rotor 105 and orthogonal to the z-axis 150 (e.g., hemispherical, each pair defining two substantially equal halves of the rotor 105). As depicted, the guide tracks 130 are longitudinal (e.g., relative to the z-axis 150.

In various embodiments an air gap (not shown) may be maintained, for example, between the rotor 105 and the stator 115. The stator 115 is provided with followers 135 (e.g., fixed). The followers 135 may protrude radially inward from the stator 115 and engage (e.g., slidably) the guide tracks 130 when the rotor 105 is disposed within the stator 115. Accordingly, the guide tracks 130 in cooperation (e.g., slidable) with the followers 135 may constrain motion between the rotor 105 and the stator 115 to a predetermined motion profile.

The magnetic force (Fm) may, for example, induce motion of the rotor 105 relative to the stator 115. Accordingly, the rotor 105 may rotate in a first direction 1A, and/or a second direction 1B. For example, the rotor 105 may rotate from a first position shown in FIG. 1B to a second position shown in FIG. 1C. The guide tracks 130 may, for example, prevent rotation about the z-axis 150. For example, the guide tracks 130 may constrain rotation to be about a y-axis (e.g., a lateral axis 155), an x-axis, or some combination thereof.

In the depicted example the EPOD is provided with locking elements 140. As depicted, the locking elements 140 are slidably disposed within the followers 135. One or more of the locking elements 140 may, for example, pressingly engage the sphere surface (e.g., the outer surface of the rotor 105) and/or the guide track 130. The locking elements 140 may, by way of example and not limitation, be electrically, hydraulically, mechanically, and/or manually actuatable.

As depicted, a payload 145 of the rotor 105 is an optical sensor(s). The payload 145 may, by way of example and not limitation, include a camera, optical sensor of one or more pixels, thermal imaging array, or some combination thereof.

In various embodiments the payload 145 may be provided with at least one electromagnetic signal emitter (e.g., optical emitter).

For example, the two guide tracks may be substantially 1800 apart (as measured about the z-axis 150). The payload 145 may have an optical axis coaxial with the z-axis. The followers 135 may define the lateral axis 155 intersecting the z-axis 150 and passing through the center of the spherical rotor 105. Actuation of the magnetic source 110 and/or the coils 120 (e.g., by the control circuit 125) may induce Fm, which may cause the rotor 105 to rotate about the lateral axis 155. The rotor 105 may rotate relative to the lateral axis 155 within the limits of the guide tracks 130. Accordingly, the relative rotation between the rotor and the stator follows a predetermined motion profile defined as a function of the guide tracks 130. Furthermore, the payload 145 may follow a predetermined trajectory profile defined as a function of the guide tracks 130 such that an angle $\alpha$ between the optical axis (coaxial with the z-axis 150) and the axis of rotation (e.g., the lateral axis 155) is less than 180 degrees.

Figure 2A:
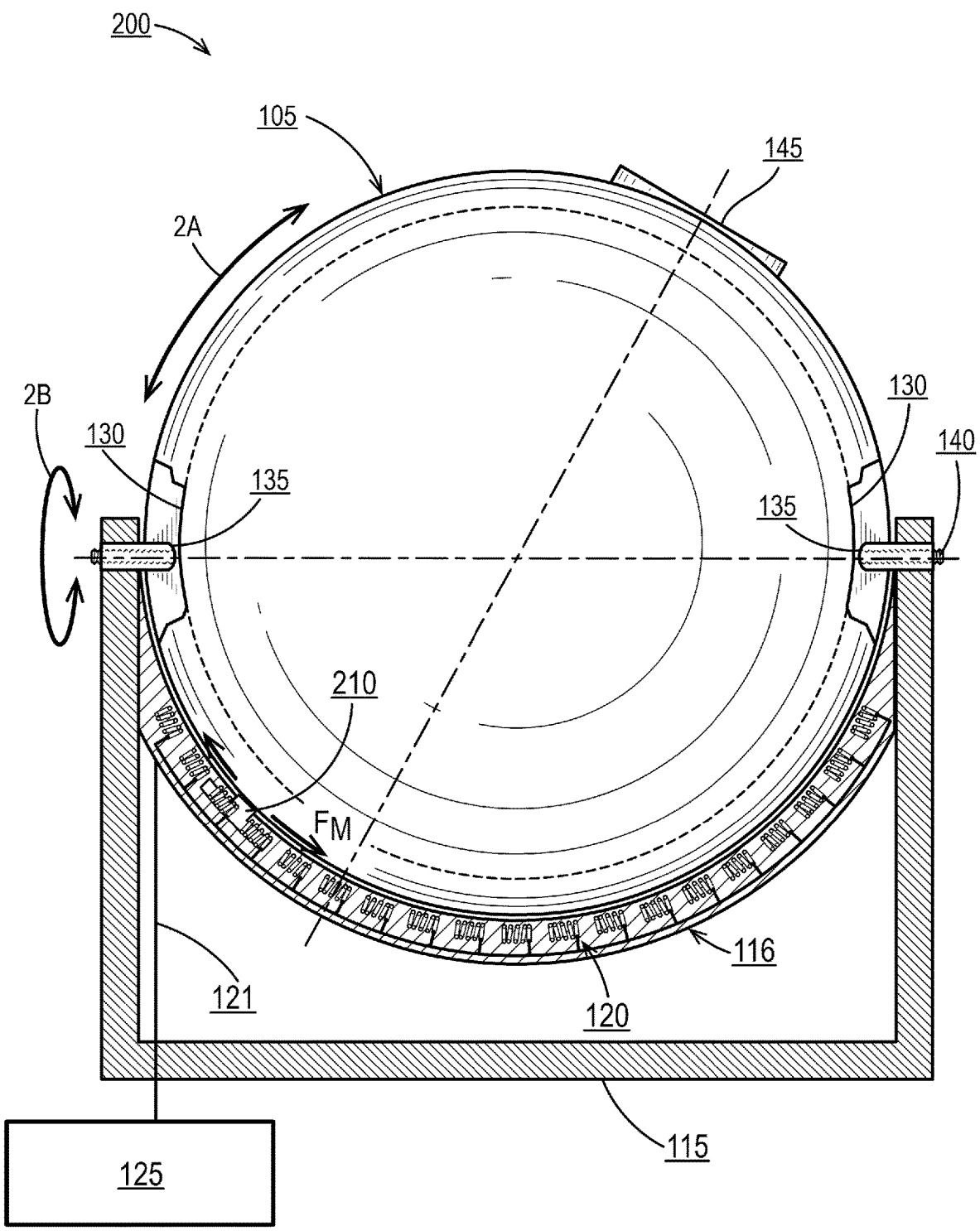
FIG. 2A and FIG. 2B depict an exemplary EPOD having a spherical rotor coupled to a magnetic source.
Figure 2B:
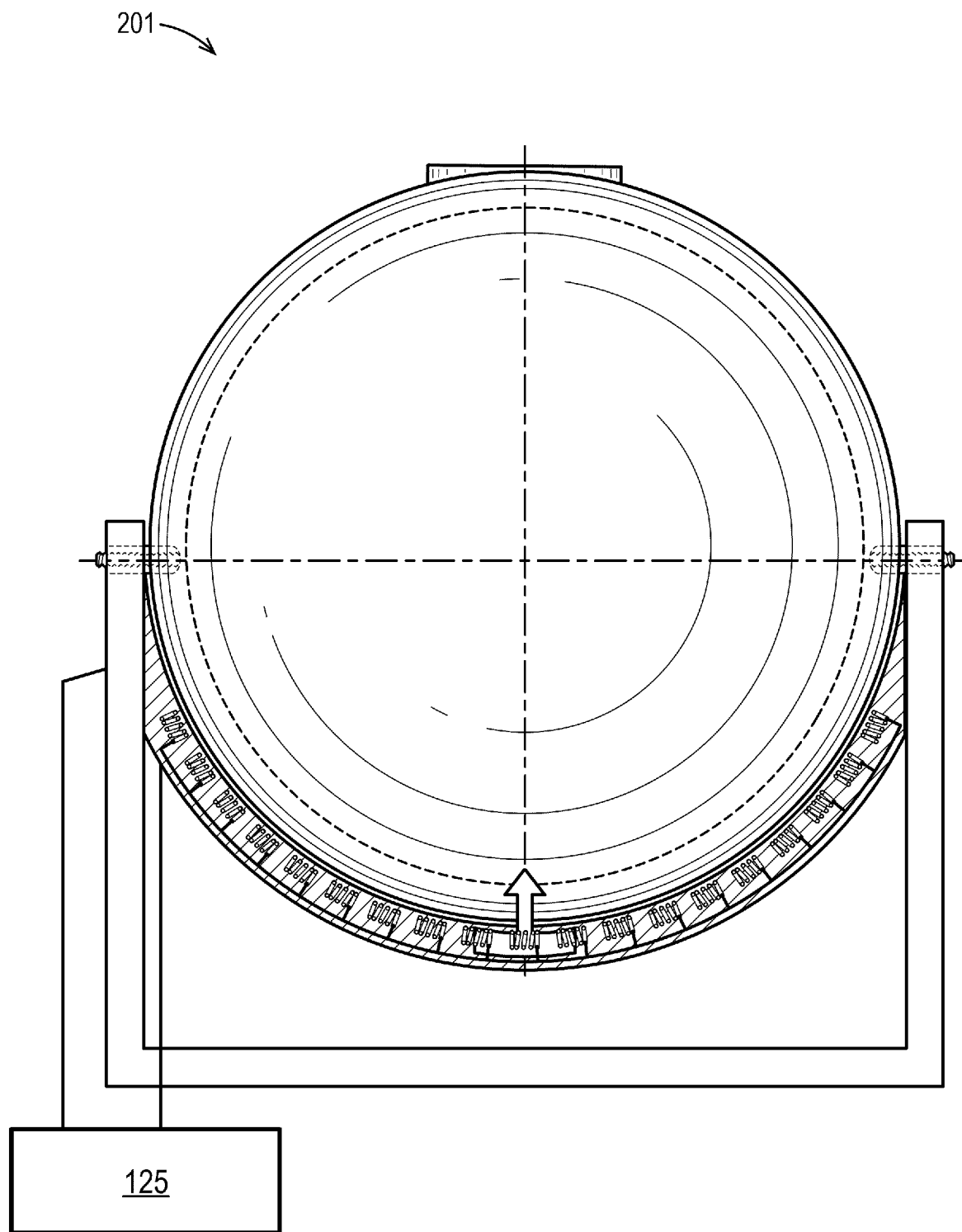

FIG. 2A and FIG. 2B depict an exemplary EPOD having a spherical rotor coupled to a magnetic source. In the depicted example, the rotor 105 is provided with a (single) magnetic source 210. The magnetic source 210 may, by way of example and not limitation, be a permanent magnet, an electromagnetic coil(s), or some combination thereof. The (spherical) rotor 105 is disposed within the stator 115 (shown in cross-section). An air gap (not shown) may be maintained between the rotor 105 and the stator 115.

The stator 115 is provided with the inner shell 116 having the array(s) of electromagnetic coils 120. The electromagnetic coils 120 are in electrical communication by a harness 121 (e.g., via integral electric communication between the coils 120 by the shell 116) to the control circuit(s) 125. The control circuit(s) 125 may, for example, operate (e.g., selectively energize) one or more of the electromagnetic coils 120 to generate an electromagnetic field which acts on the magnetic source 210 to generate a magnetic force Fm. Accordingly, movement (e.g., 2A and/or 2B) may be induced of the rotor 105 relative to the stator 115. The movement may carry the payload 145 along at least some portion of a predetermined motion profile as determined by interaction of the followers 135 with the guide tracks 130 (e.g., from the position 200 to the position 201).

Figure 3:
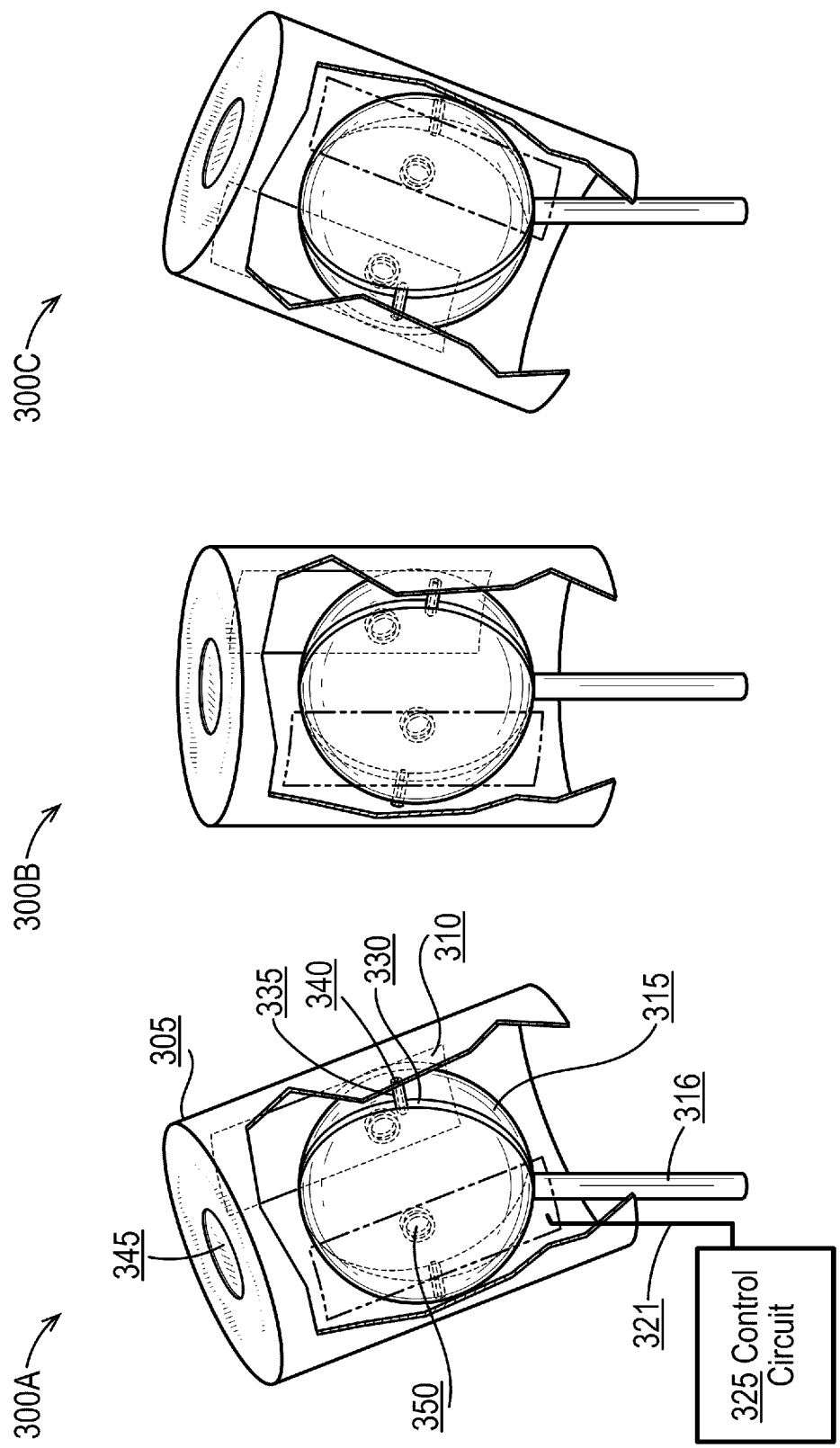
FIG. 3 depicts an exemplary EPOD having a cylindrical rotor configured to rotate about a spherical stator.

FIG. 3 depicts an exemplary EPOD having a cylindrical rotor (e.g., at least partially hollow) configured to rotate about a spherical stator. The EPOD is provided with a rotor 305. The rotor 305 is provided with (electro)magnetic array(s) 310 (e.g., on an interior surface of the rotor 305, on an exterior surface, embedded in a wall). The rotor 305 is configured as a shell about a (spherical) stator 315. The stator 315 may, for example, include electromagnetic coils and/or at least one magnetic source. The magnetic source(s) and/or coil(s) may, for example, be on a surface and/or embedded in the stator 315. The stator 315 is (fixedly) coupled to a positioning member 316 (e.g., a column).

The magnetic arrays 310 may, for example, be provided with at least one harness 321. The harness 321 may electrically connect the magnetic array(s) 310 with at least one control circuit 325. The control circuit(s) 325 may, for example, operate the array(s) 310 and/or the source(s) in the stator 315.

The stator 315 is provided with at least one guide track 330. For example, the stator 315 may be provided with two guide tracks 330 defined by coaxial, opposing radii of the stator 315. The rotor 305 is provided with followers 335 protruding radially (e.g., relative to a center of the spherical stator 315) inward. Each follower 335 is configured to slidably engage with a corresponding guide track 330. In the depicted example, (each) follower 335 is provided with an (actuatable) locking element 340. Accordingly, the rotor 305 may be releasably coupled to the stator 315 in a releasable fixed position.

The magnetic array(s) 310 may be mechanically and/or magnetically coupled to the stator (e.g., to magnetic source(s) therein) by at least one roller element 350. For example, at least one roller element 350 may be provided corresponding to each magnetic array 310. Each roller element 350 may, by way of example and not limitation, include a magnetic source, ferrous material (e.g., magnetically susceptible), or some combination thereof. The roller element 350 may, for example, provide mechanical support for rotation between the stator 315 and the rotor 105. The roller element(s) 350 may, for example, provide magnetic coupling and/or electrical communication between the stator 315 and the magnetic array(s) 310.

Operation of the (electro)magnetic array(s) 310 and/or (electro)magnetic elements in the stator 315 (e.g., by the control circuit 325) may induce magnetic force between the rotor 305 and the stator 315 (e.g., as depicted by exemplary positions 300A, 300B, and 300C). The magnetic force may, for example, induce rotation of the rotor 305 about the stator 315. The rotation may, for example, position a payload 345. The position of the payload 345 may be determined by the rotation of the rotor 305. The rotor 305 may be constrained to a predetermined motion profile. The profile may, for example, be a function of the guide tracks 130, the positioning member 316, and/or the followers 335.

Figure 4:
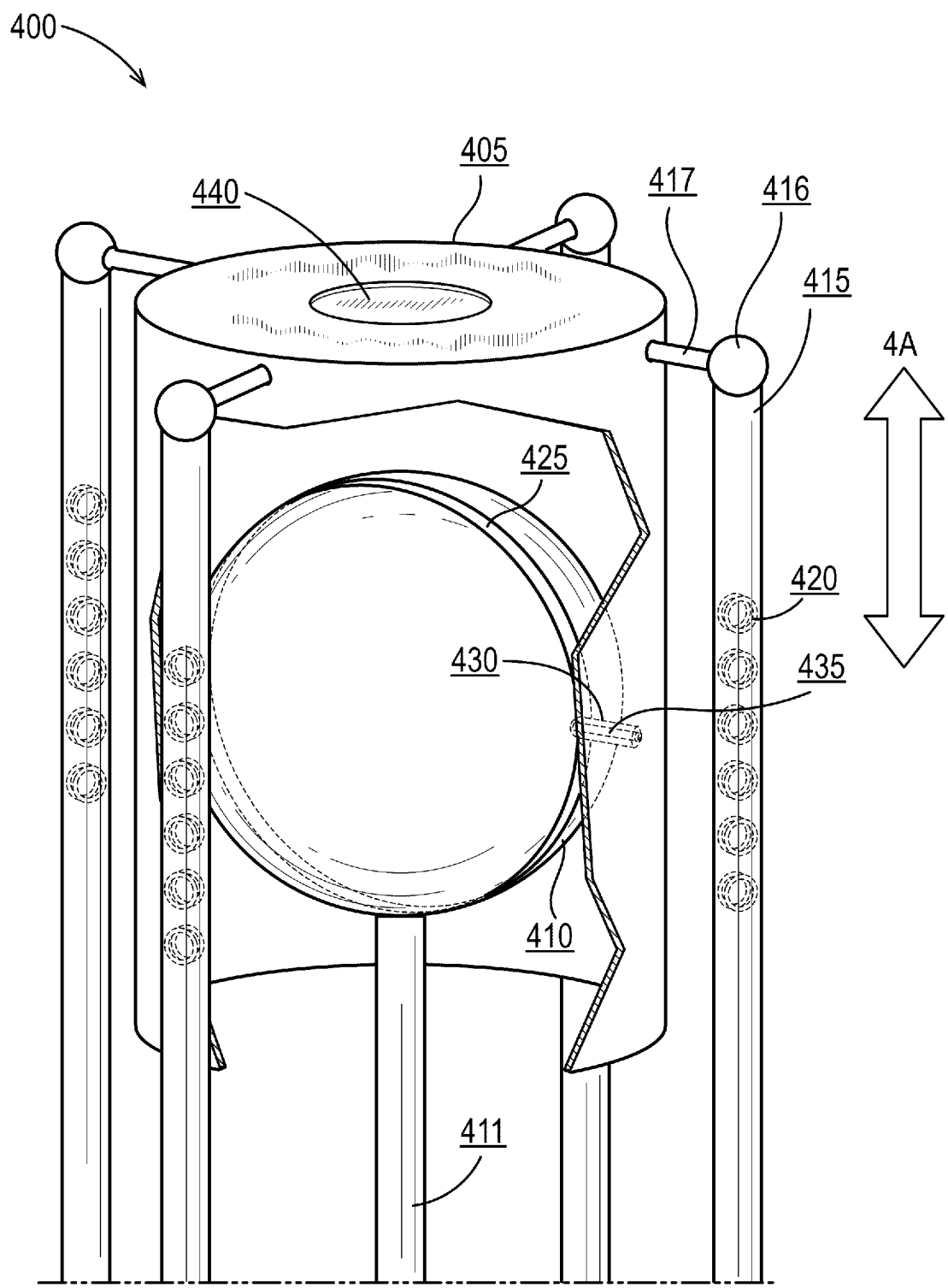
FIG. 4 depicts an exemplary EPOD having a cylindrical rotor configured to be rotated about a spherical stator by telescoping electromagnetically driven arms.

FIG. 4 depicts an exemplary EPOD having a cylindrical rotor configured to be rotated about a spherical stator by telescoping electromagnetically driven arms. In the depicted configuration 400, the EPOD is provided with a rotor 405. The rotor 405 is configured as a (at least partially hollow) shell (at least partially) surrounding a (spherical) stator 410. An air gap may be provided between the rotor 405 and the stator 410. The stator 410 is (fixedly) coupled to a positioning member 411 (e.g., a column). The rotor 405 is coupled to telescoping members 415 by joints 416 connected to coupling elements 417. In various embodiments the rotor 405 may, for example, be rotatably supported about the stator 410 by one, two, three, four, or more (telescoping) members 415.

Each telescoping member 415 is provided with at least two telescoping sections provided with respective magnetic elements 420 (e.g., arrays). In various embodiments, a first section of a pair of telescoping sections may be provided with an electromagnetic coil and/or array, and a second section may be provided with a magnetic source(s), an electromagnetic source(s), magnetic array(s), magnetically susceptible element(s) and/or arrays, or some combination thereof. At least one electromagnetic coil may be electrically coupled to at least one control circuit (not shown). The control circuit may operate the coil(s) to induce differential extension and/or retraction ('telescoping' motion 4A) of a corresponding arm(s). The extension and/or retraction may induce rotation of the rotor 405 about the stator 410. For example, a control circuit(s) may operate coil(s) such that different arms telescope different amounts and/or in different directions relative to one another.

The stator 410 is provided with at least one guide track 425. The rotor 405 is provided with at least one corresponding follower 430. Each follower 430 is configured to slidably engage a corresponding guide track 425. In the depicted example, each follower 430 is provided with an (actuatable) locking element 435.

The rotor 405 is provided with a payload 440. Operation of the telescoping member(s) 415 may cause rotation of the rotor 405 about the stator 410 such that the payload 440 is positioned in a (desired) orientation. Motion of the rotor 405 (and, accordingly, the payload 440) may be constrained to follow a predetermined motion profile defined at least partially by the guide track(s) 425 and follower(s) 430.

Figure 5:
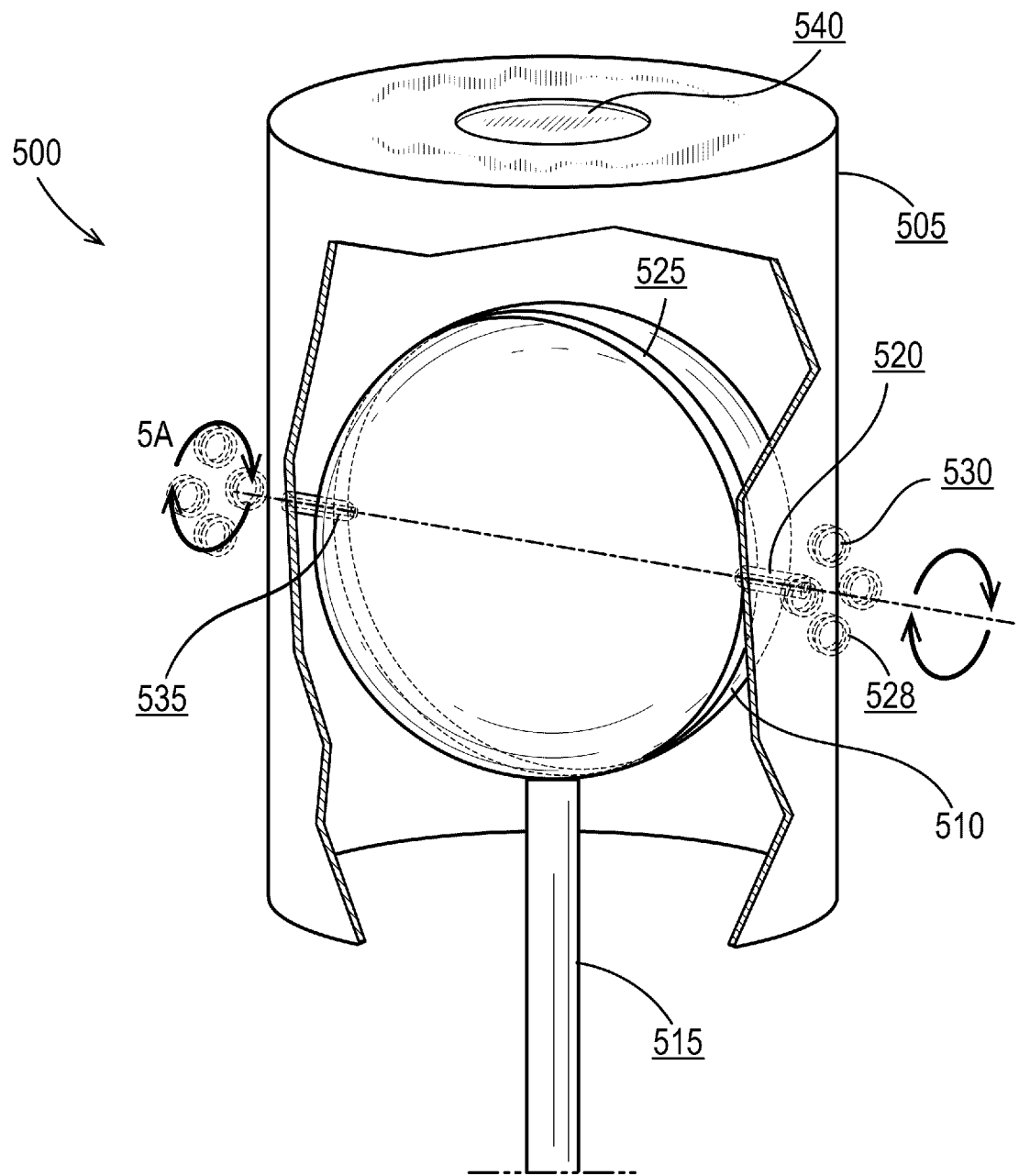
FIG. 5 depicts an exemplary EPOD having a cylindrical rotor configured to be rotated about a spherical stator by electromagnetically rotated followers.

FIG. 5 depicts an exemplary EPOD having a cylindrical rotor configured to be rotated about a spherical stator by electromagnetically rotated followers. In the depicted configuration 500, the EPOD is provided with a rotor 505 disposed over a stator 510. The stator 510 is coupled to a positioning member 515. An air gap may be provided between the rotor 505 and the stator 510. The rotor 505 is provided with at least one follower 520 extending (radially) inward. The stator 510 is provided with at least one guide track 525. Each follower 520 may be configured to slidably engage a corresponding guide track 525. In the depicted example, each follower 520 is provided with an (actuatable) locking element 535.

At least one follower 520 may, for example, be rotatably coupled to the rotor 505 (e.g., by at least one bearing). At least one of the rotor 505 and the rotatably coupled follower 520 may, for example, be provided with at least one magnetic source 530 and the other with at least one magnetic source 528 (e.g., electromagnetic coils, as shown). At least one control circuit (not shown) may be electromagnetically coupled to the at least one magnetic source 528. In the depicted example, the rotor 505 may be provided with electromagnetic coils as the at least one magnetic source 528 and the (rotatable) follower(s) 520 may be provided with magnetic source(s) 530, or vice versa. In some embodiments the magnetic source(s) 530 may, for example, include electromagnetic coil(s). The control circuit(s) may, for example, operate the coil(s) of the at least one magnetic source 528 to induce rotation (motion 5A) of the rotor 505 relative to the stator 510. In various embodiments the (electro)magnetic elements of 528 and 530 may, for example, be (replaced by) a motor (e.g., an electric motor, stepper motor, servo motor).

The stator 510 may, for example, be provided with at least one magnetic source(s) (e.g., permanent magnet, electromagnet). The magnetic source(s) of the stator 510 may, for example, interact with the (electro)magnetic source(s) 528 and/or 530 to generate a force(s) which induces motion (e.g., rotation) of the rotor 505 about the stator 510 (e.g., along the guide tracks 525). The motion may, for example, move a payload 540 along a predetermined motion profile at least partially defined by the guide track(s) 525.

Figure 6:
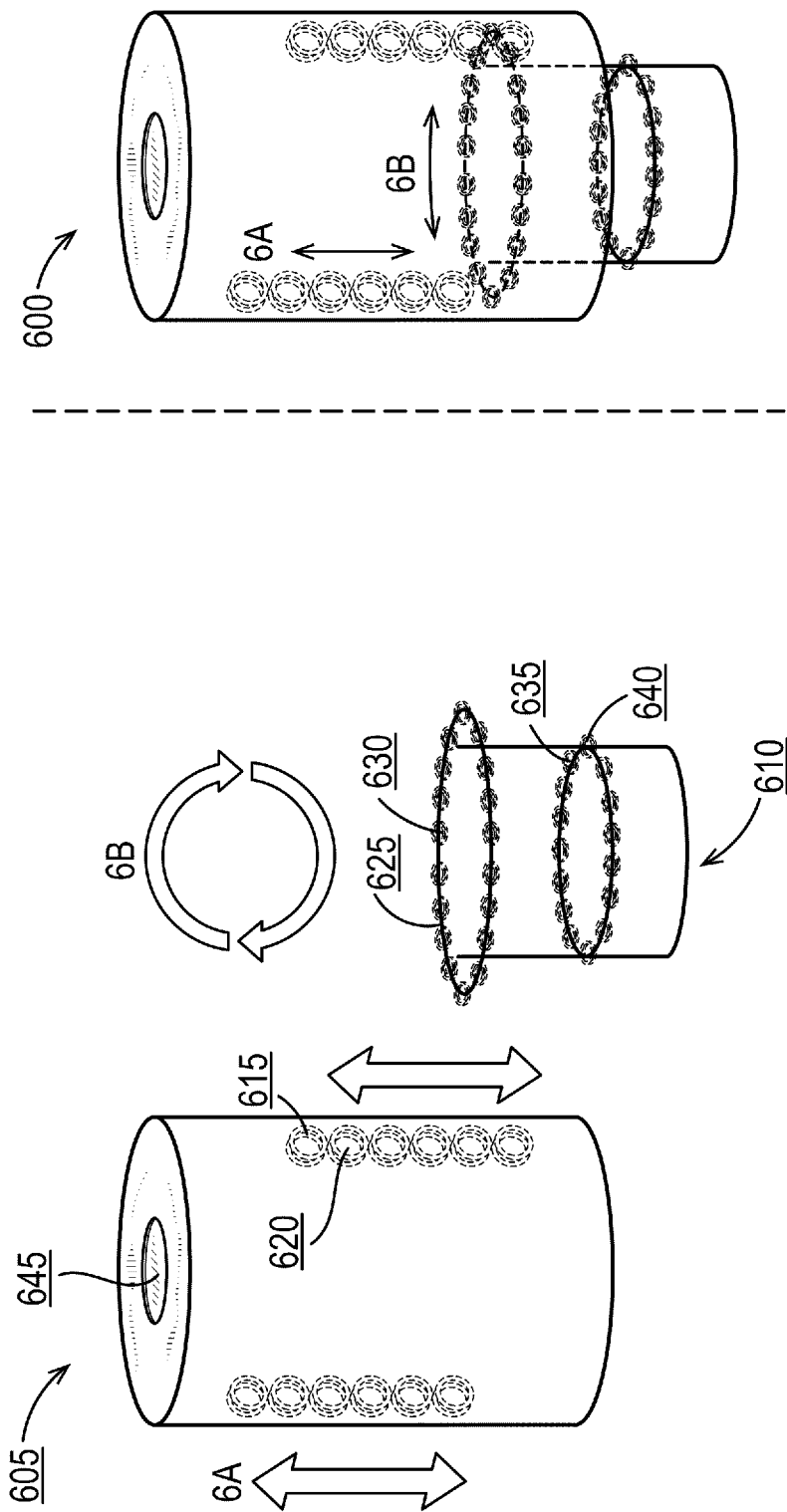
FIG. 6 depicts an exemplary EPOD configured to electromagnetically control focus and/or aperture of an optical sensor.

FIG. 6 depicts an exemplary EPOD configured to electromagnetically control focus and/or aperture of an optical sensor. In the depicted example 600, a payload carrier 605 is rotatably and/or slidably coupled to a base 610. The carrier 605 and the base 610 are provided with corresponding magnetic elements (e.g., arrays, permanent magnets, electromagnet coils, magnetically susceptible material) 615 and 620, respectively. At least one of the magnetic elements 615 and 620 may be electromagnetic coils configured to induce linear (e.g., telescopic) motion of the carrier 605 relative to the base 610 (e.g., when the coil(s) are operated by a control circuit(s), not shown). In various embodiments linear motion (e.g., motion 6A) may advantageously control zoom of an optical element(s) of a payload 645 (e.g., by controlling separation of optical members such as lenses).

In the depicted example the carrier 605 is provided with a ring 625 having magnetic elements 630. The base 610 is provided with a ring 635 having magnetic elements 640. At least some of the magnetic elements 630 and/or 640 may be electromagnetic coil(s) (e.g., in electrical communication with and/or operably coupled to by at least one control circuit, not shown). Operation of the electromagnetic coils may generate a magnetic force between the magnetic elements 630 and 640 such that rotation is induced (e.g., motion 6B) between the base 610 and the carrier 605. In various embodiments such motion may advantageously adjust focus and/or aperture size of an (optical) payload 645.

Figure 7:
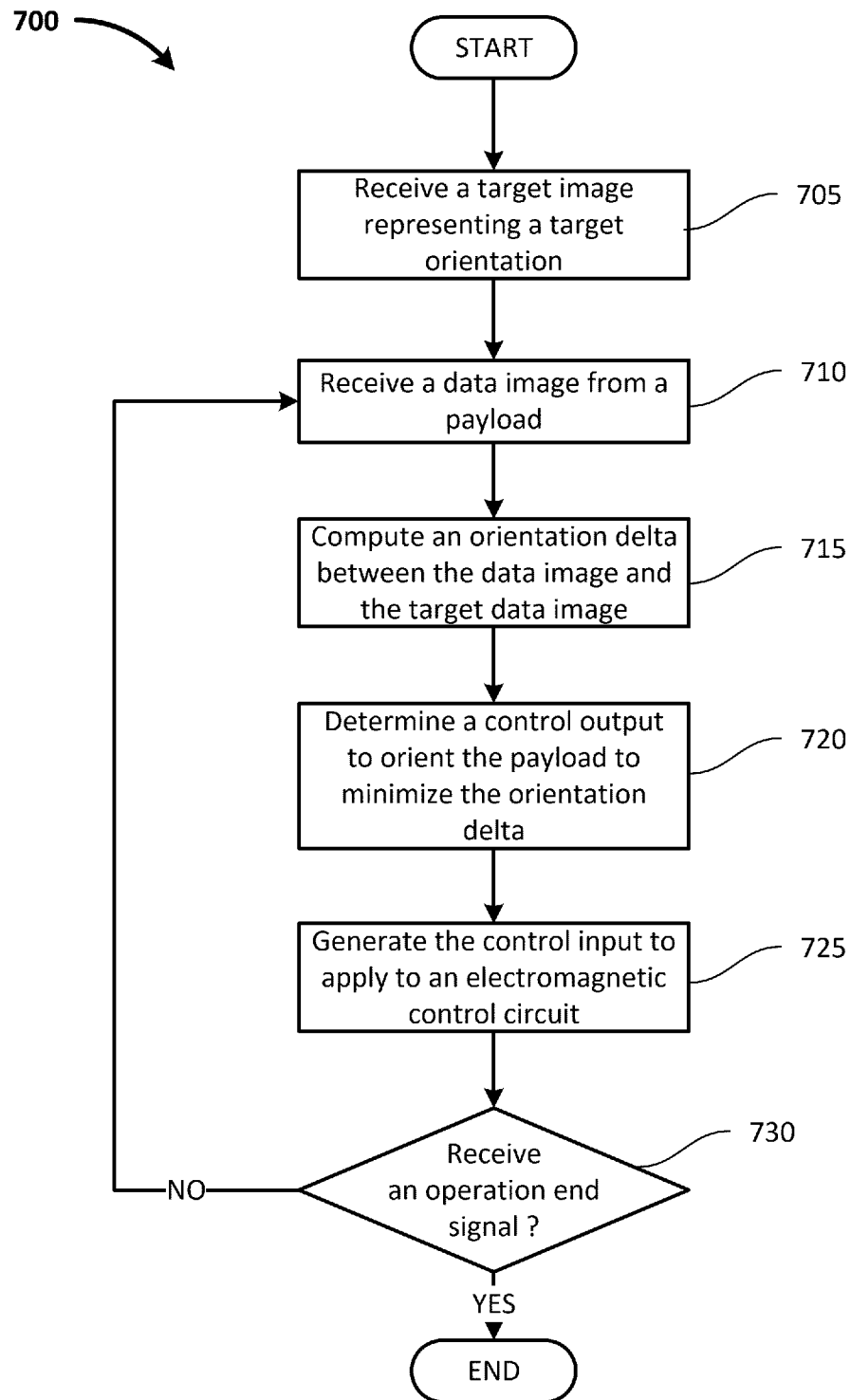
FIG. 7 depicts an exemplary orientation steering method of an exemplary EPOD.

FIG. 7 depicts an exemplary orientation steering method 700 of an exemplary EPOD (e.g., the EPOD 100). For example, the orientation steering method 700 may be executed by a control software of the control circuit 125. For example, the control software may be installed in the laptop 1010. In some examples, the control software may be installed in a remote controller of the control circuit. In some examples, the control software may be embedded in a memory module within the control circuit executed by an internal processor.

The orientation steering method 700 begins when a target image representing a target orientation is received in step 705. For example, the target orientation may be centering the user 1005 in the captured image. In some examples, the target orientation may be to center a payload at a highest temperature location detected by a thermal imaging array.

In step 710, a data image from a payload is received. For example, an image is captured by the optical sensor of the EPOD 100. Next, an orientation delta is computed between the data image and the target data image in step 715. Upon the orientation delta is computed, in step 720, a control output to orient the payload to minimize the orientation delta is determined. For example, the control output may be determined based on a predetermined motion profile. In step 725, the control input is generated to apply to an electromagnetic control circuit.

After the control input is applied, in step 730, it is determined whether an operation end signal is received. If it is determined that an operation end signal is not received, the method 700 returns to the step 710. If it is determined that an operation end signal is received, the method 700 ends.

Although various embodiments have been described with reference to the figures, other embodiments are possible. For example, although an exemplary system has been described with reference to the figures, other implementations may be deployed in other industrial, scientific, medical, commercial, and/or residential applications.

In various embodiments a payload may, by way of example and not limitation, include a security camera, motion detector (e.g., a rotor may be operated in response to a motion detector to track a moving target), surgical instrument, scanner, optical emitter, mirror, sensor, dispensing mechanism, or some combination thereof. In various embodiments an EPOD may, by way of example and not limitation, be configured and/or operated to direct a sensor (e.g., camera), emitter (e.g., sonar), projectile (e.g., bullet), and/or beam (e.g., laser) at a target.

In various embodiments an EPOD may, for example, be disposed at a tip of a medical device (e.g., an endoscope, catheter). Accordingly, for example, a payload at the tip of the medical device may be advantageously (controllably) oriented within a predetermined motion profile.

In various embodiments an EPOD payload may include a motor (e.g., a drone motor). Accordingly, for example, the motor may be advantageously oriented within a predetermined motion profile. Various such embodiments may, for example, advantageously provide controllable fine motion of the motor orientation.

In various embodiments an EPOD may be disposed in a robotic assembly. For example, an EPOD may be provided with a payload such as an artificial eye. The eye may, for example, be (controllably) oriented within a predetermined motion profile of the EPOD.

In various embodiments, an EPOD may be provided with a payload including a camera. The EPOD may, for example, be mounted on and/or in a computing device (e.g., as a front-facing camera on a tablet, laptop, smartphone). Motion of the EPOD may, for example, be controlled in response to at least one motion detector (e.g., hardware, software such as configured to perform image analysis of image(s) captured by the payload) within a predetermined motion profile. The EPOD may, for example, be controlled such that a user's face may be centered in a field of view of the camera. For example, an active schoolchild may be advantageously kept centered in the screen during remote education.

In various embodiments an EPOD may be advantageously deployed in, by way of example and not limitation, tablet devices, smart phones, desktop computers, laptop computers, printers (e.g., inkjet, laser, 3D), security/police applications (e.g., doorbell cameras, cameras, motion detectors, sound detectors, body cams, dash cams), medical applications (e.g., endoscopes, scopes, hand pieces, oral scanners), military applications (e.g., laser rangefinder designators, smart bombs, cameras, scopes, weapons), space exploration (e.g., satellites, mirrors, sensors, emitters, receivers), smart/self-driving vehicle sensors, drones (e.g., sensors, cameras, motors), robotics (e.g., sensors, cameras), or some combination thereof.

In various embodiments an EPOD may, by way of example and not limitation, be configured to have low power consumption (e.g., releasably actuating locking elements such that electromagnetic elements are only operated during motion), be configured for miniature applications (e.g., smartphone cameras), be configured for large applications (e.g., military projectile launchers), be lightweight, be drop resistant, be configured to only be activated on demand, be integrated into electromechanical systems (e.g., in an embedded circuit(s)), be integrated with software, provide directional control of a payload, provide zoom control of an optical element, provide focus control of an optical element, provide aperture control of an optical element, be provided with wireless connectivity, or some combination thereof.

In various embodiments power consumption may be reduced by routing power that is already heading to a destination in a way that achieves the desired creation and/or control of the electromagnets, magnets, and magnetic fields. For example, various embodiments may advantageously be lighter weight than existing motors, may advantageously reduce or eliminate required dedicated electricity to induce motion, may generate less heat, and/or may be more resistant to failure upon impact. For example, various embodiments may convert heat from other device processes (e.g., processor operation) into electricity and store it (e.g., in capacitors) to provide power.

In various embodiments electromagnetic circuits may, for example, be configured as integrated circuits. Some embodiments may, for example, include (micrometer scale or smaller) electromagnetic coils. In various embodiments electromagnetic coils and/or electrical pathways (e.g., harnesses, traces) may, by way of example and not limitation, be printed. For example, in some embodiments a rotor, stator, and/or other EPOD component may be 3D printed. In some such embodiments, for example, electrical conductors may be 3D printed (e.g., with the main structure of the component).

In various embodiments, an EPOD rotor and/or stator may be configured as a three-dimensional shape such as, by way of example and not limitation, a polyhedron and/or sphere. A rotor may, for example, be a polyhedron (e.g., a three-dimensional octagon) disposed within a stator configured as a shell. A rotor may, for example, be a shell disposed over a polyhedron configured as a stator.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

Various embodiments disclosed herein may be directed to electromagnetic steering of a rotor-mounted payload (e.g., the optical sensor described with reference to FIG. 1A) according to a predetermined motion trajectory profile between the rotor 105 and the stator 115, at least one of which is a sphere. The other of the rotor 105 and the stator 115 may be a shell at least partially surrounding the sphere. The payload may, by way of example and not limitation, be an optical sensor (e.g., a camera). The payload may, for example, be coupled to and/or disposed in the rotor 105. The rotor 105 may be rotatably coupled to the stator 115. One or more guide tracks 130 (e.g., 1, 2, 3, 4, or more) may be provided on the sphere. Corresponding followers 135 (e.g., 1, 2, 3, 4, or more) may protrude from an interior of the shell such that each follower slidingly engages a corresponding guide track when the sphere is disposed in the shell. Accordingly, the guide tracks 130 may at least partially define a predetermined motion profile of rotation between the sphere and the shell. In various embodiments, the guide tracks 130 may, for example, be hemispherical (e.g., defining substantially equal halves); equatorial (e.g., running 'east west'); and/or longitudinal (e.g., running 'north-south').

The stator 115 may be provided with controllable electromagnetic coils 120. In some implementations, the stator 115 may be provided with at least one magnetic source 110. In various embodiments, the at least one magnetic source 110 may include, by way of example and not limitation, one or more permanent magnets, one or more electromagnetic coils, or some combination thereof.

In some implementations, the control circuit 125 may be operably coupled to the controllable electromagnetic coils 120. The control circuit 125 may operate the electromagnetic coils 120 to generate magnetic force (e.g., attractive and/or repulsive) between the coils 120 and the at least one magnetic source 110. The magnetic force may induce rotation between the stator 115 and the rotor 105.

In various embodiments an electromagnetic steering apparatus (e.g., an EPOD) may include a rotor; a stator; and at least one electromagnetically telescoping arm rotatably coupled to the rotor. A control circuit may be operably coupled to operate the arm(s) to differentially telescope to induce relative rotation between the rotor and the stator. The stator may be a sphere and the rotor may include a concentric shell surrounding the sphere.

The sphere may be provided with at least one guide track on an outer surface and the shell may be provided with a corresponding at least one follower protruding radially inward and extending across the air gap to slidingly engage the corresponding at least one guide track such that relative rotation between the rotor and stator is constrained by the guide track to follow a predetermined motion profile.

In various embodiments an optical sensor may be mounted on a rotor. The optical sensor may have an optical axis intersecting an axis of rotation passing through the center of the sphere and the at least one guide track. Relative rotation between the rotor and the stator may cause the optical sensor to follow a predetermined trajectory profile defined as a function of the guide track such that an angle between the optical axis and the axis of rotation is less than 180 degrees.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. An electromagnetic steering apparatus, comprising:
 a rotor coupled to a magnetic source;
 an optical sensor mounted on the rotor;
 a stator comprising a plurality of controllable electromagnetic coils; and,
 a control circuit operably connected to the plurality of controllable electromagnetic coils to induce a magnetic force on the magnetic source to induce relative rotation between the rotor and the stator, wherein:
  either of the rotor or the stator is a sphere, and the other of the rotor or the stator comprises a concentric shell surrounding the sphere and being separated from the sphere by an air gap, and,
  the sphere is provided with at least one guide track on an outer surface, and the shell is provided with at least one follower corresponding to the at least one guide track, wherein the at least one follower protrudes radially inward and extends across the air gap to slidingly engage the corresponding at least one guide track, wherein the optical sensor and a center of the sphere define an optical axis, and the optical axis intersects an axis of rotation passing through the center of the sphere and the at least one guide track such that:
   the relative rotation between the rotor and the stator causes the optical sensor to follow a predetermined motion profile defined as a function of the at least one guide track such that an angle between the optical axis and the axis of rotation is less than 180 degrees.

2. The electromagnetic steering apparatus of claim 1, wherein the magnetic source comprises at least one permanent magnet.

3. The electromagnetic steering apparatus of claim 1, wherein the magnetic source is comprised entirely of electromagnetic coils.

4. The electromagnetic steering apparatus of claim 1, wherein the at least one follower comprises an actuatable lock such that, in an operation mode, the actuatable lock pressingly engages the at least one guide track.

5. The electromagnetic steering apparatus of claim 1, wherein the control circuit operates the plurality of controllable electromagnetic coils by selectively applying a voltage differential at each of the plurality of controllable electromagnetic coils, wherein the voltage differential is less than 30V.

6. The electromagnetic steering apparatus of claim 1, wherein:
 the stator is the sphere; and,
 the rotor is the shell at least partially cylindrically enclosing the stator.

7. The electromagnetic steering apparatus of claim 6, wherein:
 the magnetic source comprises at least one magnetic array magnetically coupled to the stator by at least one roller element, and
 the at least one roller element is configured to provide electrical communication between the stator and the control circuit.

8. The electromagnetic steering apparatus of claim 1, wherein:
 the rotor is the sphere;
 the stator is the shell; and,
 the at least one follower comprises the magnetic source, and is coupled to the stator such that, in an operation mode, the at least one follower is magnetically operable by the plurality of controllable electromagnetic coils to induce relative rotation between the rotor and the stator.

9. An electromagnetic steering apparatus comprising:
 a rotor coupled to a magnetic source;
 a stator comprising a plurality of controllable electromagnetic coils; and,
 a control circuit operably connected to the plurality of controllable electromagnetic coils to induce a magnetic force on the magnetic source to induce relative rotation between the rotor and the stator, wherein:
  either of the rotor or the stator is a sphere, and the other of the rotor or the stator comprises a concentric shell surrounding the sphere and separated from the sphere by an air gap, and, the sphere is provided with at least one guide track on an outer surface, and the shell is provided with at least one follower corresponding to the at least one guide track, wherein the at least one follower protrudes radially inward and extends across the air gap to slidingly engage the corresponding at least one guide track such that:

a relative rotation between the rotor and stator is constrained by the at least one guide track to follow a predetermined motion profile.

10. The electromagnetic steering apparatus of claim 9, further comprising a payload mounted on the rotor, wherein the payload and a center of the sphere define a viewing axis, and the viewing axis intersects an axis of rotation passing through the center of the sphere and the at least one guide track, such that an angle between the viewing axis and the axis of rotation is constrained by the predetermined motion profile and is less than 180 degrees.

11. The electromagnetic steering apparatus of claim 9, wherein the magnetic source comprises at least one permanent magnet.

12. The electromagnetic steering apparatus of claim 9, wherein the magnetic source comprises entirely of electromagnetic coils.

13. The electromagnetic steering apparatus of claim 9, wherein the at least one follower comprises an actuatable lock such that, in an operation mode, the actuatable lock pressingly engages the at least one guide track.

14. The electromagnetic steering apparatus of claim 9, wherein the control circuit operates the plurality of controllable electromagnetic coils by selectively applying a voltage differential at each of the plurality of controllable electromagnetic coils.

15. The electromagnetic steering apparatus of claim 9, wherein:

the stator is the sphere; and,
the rotor is the shell at least partially cylindrically enclosing the stator.

16. The electromagnetic steering apparatus of claim 15, wherein:

the magnetic source comprises at least one magnetic array magnetically coupled to the stator by at least one roller element, and
the at least one roller element is configured to provide electrical communication between the stator and the control circuit.

17. The electromagnetic steering apparatus of claim 9, wherein:

the rotor is the sphere;
the stator is the shell; and,
the at least one follower comprises the magnetic source, and is coupled to the stator such that, in an operation mode, the at least one follower is magnetically operable by the plurality of controllable electromagnetic coils to induce relative rotation between the rotor and the stator.

18. An electromagnetic steering apparatus comprising:

a rotor coupled to a magnetic source;
a stator comprising a plurality of controllable electromagnetic coils; and,
a control circuit operably connected to the plurality of controllable electromagnetic coils to induce a magnetic force on the magnetic source to induce relative rotation between the rotor and the stator, wherein:

either of the rotor or the stator is a sphere, and the other of the rotor or the stator comprises a concentric shell surrounding the sphere and being separated from the sphere by an air gap, and,
the sphere is provided with at least one guide track on an outer surface, and the shell is provided with at least one connection means for slidingly engage the corresponding at least one guide track such that:
a relative rotation between the rotor and stator is constrained by the at least one guide track to follow a predetermined motion profile.

19. The electromagnetic steering apparatus of claim 18, further comprising a payload mounted on the rotor, wherein the payload and a center of the sphere define a viewing axis, and the viewing axis intersects an axis of rotation passing through the center of the sphere and the at least one guide track, such that an angle between the viewing axis and the axis of rotation is constrained by the predetermined motion profile and is less than 180 degrees.

20. The electromagnetic steering apparatus of claim 18, wherein the control circuit operates the plurality of controllable electromagnetic coils by selectively apply a voltage differential at each of the plurality of controllable electromagnetic coils.

* * * * *